Patented May 10, 1932

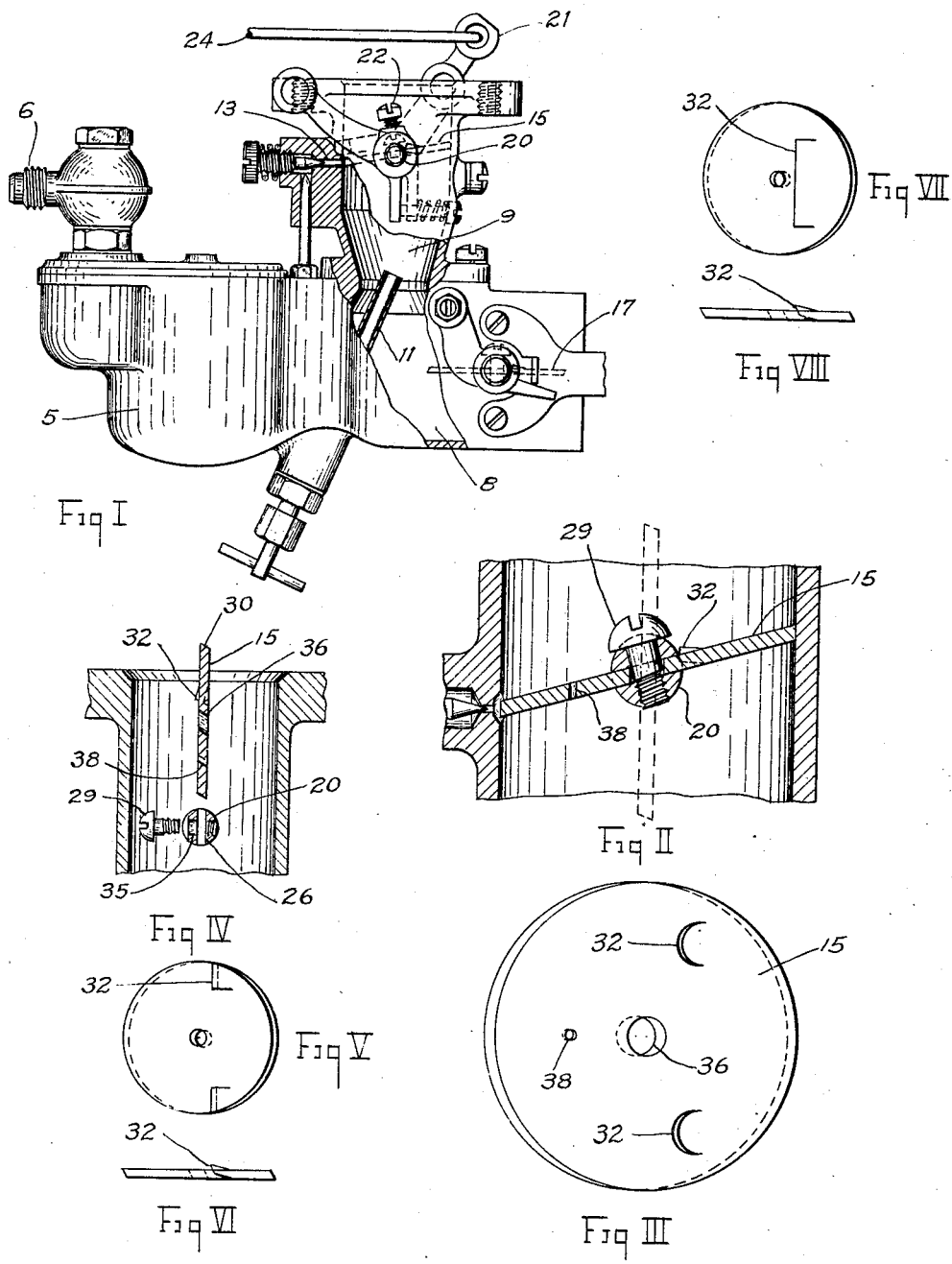

1,857,477

UNITED STATES PATENT OFFICE

GEORGE F. RITTER, OF TOLEDO, OHIO, ASSIGNOR TO THE TILLOTSON MANUFACTURING COMPANY, OF TOLEDO, OHIO, A CORPORATION OF OHIO

VALVE CONSTRUCTION

Application filed May 23, 1928. Serial No. 280,034.

This invention relates to a method and means of manufacture and assembly of regulating valves, and more particularly to improvements in valves for use in regulating the flow of gases to internal combustion engines. In the manufacture of carburetors for use with internal combustion engines, the carburetor of the usual construction incorporates a controlling valve or valves of the so-called "butterfly" type for regulating the flow of gases to the engine. This valve construction usually consists of a slotted shaft which receives a substantially circular disc secured to the shaft by means of a plurality of screws. This construction of a valve is, however, very expensive in that a great deal of time is consumed in assembling the shaft and valve disc. The disc must be located correctly with respect to the shaft and the walls of the gas conduit before the securing means is applied, and as the valve is usually located in an elongated conduit which is very inaccessible, this operation is therefore very difficult.

One of the principal objects of this invention is the provision of a valve construction which may be easily and quickly assembled.

Another object of this invention is the provision of means whereby the person assembling the valve structure may know immediately how the parts should be arranged.

Another object is the provision of a valve disc which is formed with locating means so that the disc may be accurately positioned with respect to its operating shaft and the walls of the gas conduit.

Still another object is the provision of a simple and improved means for securing the valve disc to its operating shaft.

A further object is the provision of a valve construction for carburetors which may be easily and inexpensively assembled by inexperienced workmen without the use of special tools.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention which may be preferred, in which Figure I is a side elevational view of a carburetor embodying my invention certain parts being shown in section.

Figure II is an enlarged fragmentary detail view of a portion of a carburetor showing the valve structure of my invention in closed position.

Figure III is a top plan view of the valve disc per se, the disc being shown in a horizontal plane.

Figure IV is a fragmentary detail sectional view showing the valve operating shaft and valve disc disassembled.

Figure V is a top plan view showing a modified form of valve disc.

Figure VI is a side elevational view of the disc shown in Figure V.

Figure VII is a top plan view showing still another form of valve disc.

Figure VIII is a side elevational view of the disc shown in Figure VII.

Referring to the drawings in detail I have shown a preferred form of my invention as incorporated in a carburetor or mixing device for use with internal combustion engines, but it is to be understood that I contemplate the use of my invention wherever the same may be found to be applicable. As the carburetor forms no part of the present invention per se, I will only describe it in such detail as to show the connection of my invention therewith. It comprises an irregular shaped fuel supply chamber or bowl 5 provided with a fuel inlet 6 which communicates with a fuel supply tank (not shown). An air intake passage 8 communicates with a mixing chamber or passage 9, the fuel being mixed with the air by means of a nozzle 11 located in a constricted portion or Venturi forming a part of the mixing chamber. The carburetor is also provided with an auxiliary fuel nozzle 13 which is operative only at idling speeds of the engine.

Positioned within the gas conduit or mixing chamber 9 is a valve 15 of the so-called "butterfly" disc type, this valve controlling the quantity of the mixture taken into the cylinders of the engine. The air intake 8 is also provided with a similar valve disc 17 which controls the quantity of air admitted to the mixing chamber. As the valve discs 15 and 17 are of substantially identical construction and are mounted in the same manner in the air supply passage and the mixing passage, I will describe only one of them in detail.

Positioned transversely of the mixing passage or conduit 9 is an operating shaft 20 one end of which is provided with an operating arm 21 which is secured to the shaft by means of a screw 22 and is suitably connected by means of a rod 24 to a suitable throttle operating means (not shown). The shaft 20 is formed with a longitudinal slot 26 which is adapted to receive the substantially circular valve disc 15 which is secured thereto by means of a screw 29. It will be obvious that movement of the arm 21, by means of the rod 24, will change the relative position of the valve disc 15 and permit more or less gas to be admitted to the cylinders of the engine.

As the particular construction of the valve disc and the method of assembly thereof form outstanding features of this invention, I will, therefore, describe them in further detail. The disc 15 is provided with diametrically opposed edges 30 forming acute angles with the plane surfaces of the disc, more particularly forming a rhomboid, so that the periphery of valve disc when in closed position will snugly fit the walls of the mixing passage. From examination of Figures I and II it will be apparent that when the valve is fully closed, the disc 15 is out of the horizontal position with respect to the vertical axis of the gas conduit in the carburetor, and is fully opened when it is moved to a position in which the plane surfaces of the disc are parallel with the vertical axis of the conduit or mixing passage as shown in dotted position in Figure II. Thus it will be seen that the valve may be moved from closed to full opened position by a movement which is considerably less than 90 degrees.

The disc is also provided with a plurality of raised projections or integrally struck up portions 32 which perform several very important functions. The operation of assembling a flat valve disc and an operating shaft has heretofore been a very difficult and expensive one. This was due to the fact that the person assembling the parts could not determine, except by very minute examination of the edges of the disc, how the disc should be placed in the slot in the operating shaft in order to function properly, and as the discs are of comparatively thin sheet material, the rhomboidal edges thereof are not at once apparent. The raised projections 32 formed out of the body of the disc obviate this difficulty as the assembler instantly knows the proper position of the disc by noting the position of the raised portions thereof. These projections also serve to prevent any rotation of the disc relative to its supporting shaft 20 after the parts have been assembled, as the insertion of the retaining screw 29 holds the projections 32 in contact with the exterior surface of the shaft 20.

Furthermore, if there is a slight discrepancy between the width of the disc and the slot in the operating shaft so that the disc would be loosely received therein, the disc is liable to pass entirely through the slot or be incorrectly positioned with respect thereto so that the means for securing the disc to the shaft cannot be applied without considerable manipulation of the disc which consumes a great deal of time and makes this operation very expensive as well as aggravating to the assembler. The projections 32 completely eliminate these difficulties in that they form stops or locating means when the disc is inserted in the slot in the shaft and prevent further downward movement of the disc. The securing means in the form of a screw 29 may then be inserted through the openings 35 and 36 in the shaft and disc respectively to properly secure the disc with respect to the walls of the mixing chamber 9. By means of these projections on the discs, the same may be properly positioned with respect to its operating shaft and one centrally located screw may be used to secure the disc to the shaft where formerly it was necessary to use two or more screws or other securing means to retain the parts in fixed relation.

The method of assembling the valve disc and its operating shaft will be obvious from examination of Figures II and IV of the drawings. The operating shaft is rotated until the slot therein is in a vertical plane in which position the valve disc may be easily inserted until the projections 32 engaging the periphery of the shaft prevent further downward movement of the disc. The shaft is then turned to the position shown in Figure II with the valve closing the conduit and the retaining screw 29 inserted in the registering openings in the shaft and disc, thus serving to hold the parts in fixed relation.

As particularly shown in Figures II, III and IV the valve disc 15 may be provided with a comparatively small opening 38 for admitting a predetermined quantity of the air through the gas conduit at idling speeds of the engine i. e. when the valve is in closed position.

It is to be noted that the edges of the disc, the walls of the opening 26 and the edges of the projections 32 are all parallel to each other and arranged at acute angles with respect to the plane surfaces of the disc. Such an arrangement permits the disc to be blanked out of a sheet of material, the opening 36 punched therein, and the projections 32 raised thereupon in one operation thereby reducing the manufacturing costs to a minimum.

In the modified form of valve disc shown in Figures V and VI, I have illustrated the raised projections 32' as formed on substantially diametrically opposite edges of the disc 15'.

In the modified form of Figures VII and VIII I have shown only one projection which consists in an elongated rib 32'' formed on the disc 15'' and which performs the same functions as the plurality of smaller projections hereinbefore described.

It is apparent that, within the scope of the invention modifications and different arrangements may be made other than is herein disclosed; and the present disclosure is illustrative merely, the invention comprehending all variations thereof.

What I claim is:

1. A process of assembling a valve structure which consists of positioning a shaft transversely of a conduit and subsequently applying a valve disc to the shaft and properly locating the parts by means of raised portions on the disc and applying securing means to prevent relative movement of the parts.

2. A process of assembling a valve structure which consists of positioning a slotted shaft transversely of a cylindrical conduit and subsequently inserting a valve disc until raised portions of the disc engage the shaft and applying a securing means to prevent relative movement of the parts.

3. In a device of the character described, in combination, a conduit, an operating shaft, a valve for cooperating with said conduit comprising a shaft extending transversely of the conduit and having a valve disc; means including a raised portion on said disc for properly positioning the same with respect to said shaft and the walls of said conduit; and means for securing the disc to said shaft.

4. In a device of the character described, in combination, a conduit, a valve structure in said conduit comprising a transversely extending shaft having a slot therein, a valve disc adapted to be positioned in said slot; means including a raised portion on said disc for properly locating the same with respect to said shaft; and means for securing said disc to said shaft.

5. In a device of the character described, in combination, a conduit, a valve structure in said conduit comprising a shaft, a valve disc; means including a raised portion on said disc for properly locating the disc with respect to said shaft; and means for fixedly securing said disc to said shaft.

6. In a device of the character described, in combination, a conduit, a shaft in said conduit, a valve disc having a plurality of raised portions, said raised portions serving to properly position the disc with respect to said shaft; and means including a screw for securing the disc to said shaft.

7. In a device of the character described, in combination, a conduit, a valve disc in said conduit, operating means for said valve disc, the axis of said operating means being substantially parallel with the plane of said disc. Said valve disc having a plurality of raised portions for properly positioning the disc with respect to the operating means; and means for securing the disc to said operating means.

8. In a device of the character described, in combination, a conduit, a valve structure in said conduit comprising a transversely extending shaft having a slot, a valve disc in said slot, said disc having a plurality of raised portions for properly positioning the disc with respect to said shaft and said conduit; and means including a screw for securing the disc to said shaft.

9. In a device of the character described, in combination, a conduit, a valve structure in said conduit comprising a laterally extending shaft, a valve disc having diametrically opposed edges forming a rhomboid with the plane surfaces of said disc, said disc being formed with a plurality of raised portions for properly positioning said disc with respect to said shaft and said conduit; and means including a screw for securing said disc to said shaft.

10. In a device of the character described, in combination, a conduit, a transversely extending shaft in said conduit and having an opening therein, a valve disc having diametrically opposed edges which form a rhomboid with the plane surfaces of the disc, said disc being formed with a plurality of raised projections for properly positioning the disc with respect to said shaft, an opening in said disc the walls of which are substantially parallel with the edges of the disc; and means including a screw adapted to pass through the openings in said shaft and disc for securing the parts in fixed relation.

11. In a carburetor combination, a valve in said carburetor comprising an operating shaft, a valve disc; means on said disc comprising a plurality of raised projections for properly positioning the disc with respect to said shaft; and means for securing the said disc to the shaft.

12. In a carburetor, in combination, a valve in said carburetor comprising an operating shaft having a slot, a valve disc having diametrically opposed edges forming a rhomboid with the plane surfaces thereof and adapted to be positioned in said slot, said disc being formed with a plurality of raised portions for positioning the latter with respect to the shaft; and means for securing said disc to the shaft.

13. In a device of the character described, a substantially circular valve disc formed from sheet material; operating means for said disc; means including an integral struck up portion on said disc for properly positioning the disc with respect to the operating means.

14. In a device of the character described, a substantially circular valve disc, operating means therefor including a shaft having a slot adapted to receive said disc, said disc being formed with raised portions located on either side of the center thereof and adapted to engage said shaft to prevent relative rotation of the disc; and means including a screw positioned substantially between said raised portions for holding the parts in fixed relation.

15. In a device of the character described, a substantially circular valve disc formed from sheet material, said disc having diametrically opposed edges forming with the plane surface thereof a rhomboid; and a raised portion on said disc for positioning the same with respect to a support; and an opening in said disc adapted to receive a securing means for retaining the disc to its supporting means.

In testimony whereof, I affix my signature.

GEORGE F. RITTER.